United States Patent
Dupuy

(10) Patent No.: US 7,175,782 B2
(45) Date of Patent: Feb. 13, 2007

(54) CONDUCTIVE VINYLAROMATIC POLYMER FILLED WITH BLACK CARBON

(75) Inventor: Carole Dupuy, Evreax (FR)

(73) Assignee: Atofina, Puteaux (FR)

(*) Notice: Subject to any disclaimer, the term of this patent is extended or adjusted under 35 U.S.C. 154(b) by 134 days.

(21) Appl. No.: 10/343,417

(22) PCT Filed: Jul. 30, 2001

(86) PCT No.: PCT/EP01/08816

§ 371 (c)(1),
(2), (4) Date: Jul. 1, 2003

(87) PCT Pub. No.: WO02/10268

PCT Pub. Date: Feb. 7, 2002

(65) Prior Publication Data

US 2004/0012001 A1    Jan. 22, 2004

(30) Foreign Application Priority Data

Aug. 2, 2000    (FR) .................................. 00 10199

(51) Int. Cl.
    *H01B 1/24* (2006.01)
(52) U.S. Cl. .................. 252/511; 264/105; 524/495
(58) Field of Classification Search ................ 252/511; 264/105; 524/495
    See application file for complete search history.

(56) References Cited

U.S. PATENT DOCUMENTS

| | | | |
|---|---|---|---|
| 5,409,986 A | 4/1995 | Boudry et al. | |
| 5,415,906 A * | 5/1995 | Miyakawa et al. | 428/35.7 |
| 5,432,235 A | 7/1995 | Arsac et al. | |
| 5,486,571 A | 1/1996 | Arsac et al. | |
| 5,620,802 A | 4/1997 | Arsac et al. | |
| 5,707,699 A * | 1/1998 | Miyakawa et al. | 428/35.7 |
| 5,747,164 A * | 5/1998 | Miyakawa et al. | 428/411.1 |

FOREIGN PATENT DOCUMENTS

| | | |
|---|---|---|
| EP | 0 538 139 | 4/1993 |
| JP | 8-337714 | 12/1996 |
| JP | 1996-337714 | * 12/1996 |
| JP | 10-329278 | 12/1998 |

OTHER PUBLICATIONS

Database WPI Section Ch, Week 199710, Derwent Publications Ltd., London, GB; AN 1997-103771 XP002186042.
Database WPI Section Ch, Week 199909, Derwent Publications Ltd., London, GB; AN 1999-100186 XP002164309.

* cited by examiner

*Primary Examiner*—Mark Kopec
(74) *Attorney, Agent, or Firm*—Smith Gambrell & Russell

(57) ABSTRACT

The invention concerns a composition comprising: 35 to 65 wt. % of radical vinylaromatic polymer, 5 to 40 wt. % of ethylene and alkyl(meth)acrylate copolymer, 2 to 20 wt. % of copolymer with vinylaromaticdiene monomer blocks, a necessary and sufficient amount of conductive black carbon for providing the composition with resistivity ranging between 1.104 to 1.109 ω·cm. The composition maintains good conductivity whatever the transformation mode used and has excellent impact resistance.

23 Claims, 1 Drawing Sheet

Figure 1:
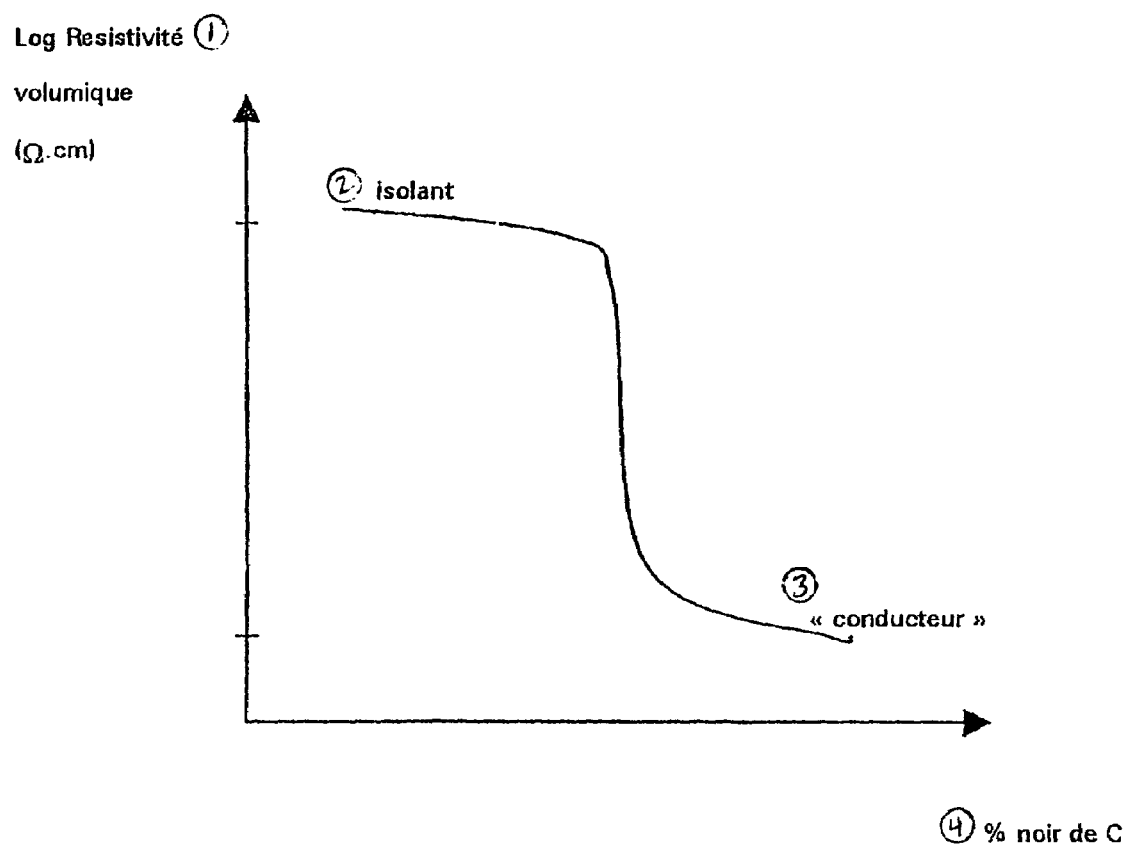

Key:
1  Log volume resistivity (Ω·cm)
2  Insulating
3  "Conductive"
4  % C black Key:  1   Log volume resistivity (Ω•cm)
      2   Insulating
      3   "Conductive"
      4   % C black

CONDUCTIVE VINYLAROMATIC POLYMER FILLED WITH BLACK CARBON

FIELD OF THE INVENTION

The invention relates to the domain of conductive compositions based on a vinylaromatic polymer containing carbon black.

BACKGROUND OF THE INVENTION

These compositions are generally used for coming in contact with electronic components as in applications of the "packaging for electronics" type or of the support plate type for handling electronic components. In these applications, it is desirable to be able to easily dissipate the electrostatic charges in order not to damage the electronic components which are in contact with the composition. The composition must therefore have a volume resistivity less than approximately $10^{11}$ Ω·cm, without however being totally conductive, since a possible discharge could then be violent and damage the components. The introduction of carbon block in sufficient quantity in a polymer makes it possible to lower its volume resistivity. The intermediate resistivities between $10^5$ and $10^{11}$ Ω·cm are generally difficult to attain because of the percolation curve of carbon black. In effect, in this domain of resistivities, the resistivity varies greatly with the percentage of carbon black, and the latter must therefore be measured out exactly. In a general manner, it can be considered that for a given carbon black/polymer pair, there is a percolation curve whose course is that of FIG. 1.

The introduction of carbon black in a polymer is generally difficult, especially in a material of the polystyrene type which poorly accepts solid fillers, which is generally expressed by an insufficient conductivity and a loss of mechanical properties (because of the formation of agglomerates of carbon black and therefore also of zones free of carbon black and which are poor conductors). The dispersion of the carbon black must therefore be sufficient so that the material is conductive and keeps suitable mechanical properties. Moreover, said dispersion must be stable during transformation, particularly with regard to the extensive shearing encountered during this transformation such as injection, under penalty of loss of conductivity and of mechanical properties. In effect, excessive shearing brings about deterioration of the particles of carbon black which lose their conductivity.

Furthermore, it is desirable for the material filled with carbon black to keep a suitable impact resistance, which is known to be difficult in the case of vinylaromatic polymers.

DESCRIPTION OF THE INVENTION

The invention solves the above-mentioned problems. The invention relates to a composition containing:
- 35 to 65 wt % of vinylaromatic polymer preparation,
- 5 to 40 wt % of ethylene and alkyl (meth)acrylate copolymer
- 2 to 20 wt % of vinylaromatic monomer-diene block copolymer.
- a necessary and sufficient quantity of conductive carbon black for the composition to have a resistivity ranging from $1 \times 10^4$ to $1 \times 10^9$ Ω·cm.

The vinylaromatic polymer preparation comes from the radical polymerization of at least one vinylaromatic monomer. It can be a statistical copolymer of a vinylaromatic monomer and a diene monomer. It can also contain a matrix of a vinylaromatic polymer surrounding nodules of rubber such as a polydiene. A polydiene comes from the polymerization of a diene monomer.

The vinylaromatic polymer preparation can be an impact vinylaromatic polymer modified by rubber, that is to say containing a matrix of vinylaromatic polymer surrounding nodules of rubber. The rubber is generally a polydiene such as a polybutadiene. Such a preparation is generally produced by radical polymerization of at least one vinylaromatic monomer in the presence of rubber. This preparation is generally an impact polystyrene of which the matrix is made of polystyrene and the rubber nodules are made of polybutadiene, said nodules generally containing one or more polystyrene inclusions.

The vinylaromatic polymer preparation can also be a homopolymer of at least one vinylaromatic monomer such as crystal polystyrene.

The vinylaromatic polymer preparation generally contains at least 80 wt % polymerized units coming from the vinylaromatic monomer.

The vinylaromatic polymer preparation can contain up to 20 wt %, for example, 2 to 20 wt %, polymerized units of a diene such as butadiene. This diene can have been introduced in said preparation in the form of a rubber in the context of the manufacturing of an impact vinylaromatic polymer.

Vinylaromatic monomer is understood to mean an ethylenically unsaturated aromatic monomer such as styrene, vinyltoluene, α-methylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert-butyl-3-styrene, dichloro-2,4-styrene, dichloro-2,6-styrene and vinyl-1-naphthalene. Styrene is a preferred vinylaromatic monomer. The vinylaromatic polymer preparation can also contain an acrylonitrile-butadiene-styrene copolymer (ordinarily known as ABS).

Diene monomer is understood to mean a diene chosen from straight or cyclic, conjugated or nonconjugated dienes, such as butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, the 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylindene tetrahydroindene. Butadiene is a preferred diene monomer.

With regard to the ethylene and alkyl (meth)acrylate copolymer, the alkyls can have up to 24 carbon atoms. Examples of alkyl acrylate or methacrylate are in particular methyl methacrylate, ethyl acrylate, n-butyl acrylate, isobutyl acrylate, 2-ethylhexyl acrylate. The MFI (melt flow index or fluidity index in the melted state) of these copolymers is advantageously between 0.3 and 50 g/10 min (190° C.–2.16 kg). Advantageously, the (meth)acrylate content is between 18 and 40 wt % and preferably between 22 and 28 wt %. These copolymers can be manufactured by radical polymerization in a tube or autoclave at pressures between 1000 and 2500 bar. As preferred ethylene and alkyl (meth)acrylate copolymer, it is possible to mention an ethylene and butyl acrylate copolymer.

The vinylaromatic monomer-diene copolymer is a multiblock copolymer containing at least one block of vinylaromatic polymer and at least one block of polydiene, such as those ordinarily known as SBS such as in particular those marketed under the brands Finaclear or Finaprene. These copolymers can have a linear or radial structure. This copolymer preferably contains 10 to 70% diene and 90 to 30% vinylaromatic monomer. These copolymers are generally obtained by anionic polymerization.

Preferably, the vinylaromatic monomer contained in the radical vinylaromatic polymer preparation and the vinylaromatic monomer contained in the vinylaromatic monomer-diene block copolymer are of the same nature and are generally styrene.

Preferably, the diene optionally contained in the radical vinylaromatic polymer preparation and the diene contained in the vinylaromatic monomer-diene block copolymer are of the same nature and are generally butadiene.

The composition according to the invention can be used for being worked (or shaped) in various manners (compression, injection, extrusion). The composition according to the invention remains conductive after said working. It has a suitable impact resistance and a suitable bending modulus. The articles obtained after transformation of the composition according to the invention are, for example, intended for applications in packaging for electronics.

The composition according to the invention has conductive properties. Its volume resistivity ranges from $1\times10^4$ to $1\times10^9$ and more generally from $1\times10^4$ to $1\times10^7$ Ω·cm regardless of the method of transformation which is used. It offers a good compromise of modulus/impact mechanical properties. Generally, the impact resistance (notched Charpy impact resistance) of the composition according to the invention is at least equal to that of the vinylaromatic polymer preparation which it contains.

The quantity of carbon black to be used depends on its grade and on its structure. The structure of a carbon black expresses the manner in which the base carbon particles, constituting the carbon black, are arranged in aggregates, or agglomerates. The structure of a carbon black can be expressed by its specific surface area (measured by the nitrogen adsorption method—BET method—according to the standard ASTM D 3037-89) as well as by its DBP absorption (DBP meaning dibutylphthalate, measured according to the standard ASTM D 2414-90). The carbon black can be superconductive, that is to say extrafine (specific surface area greater than approximately 500 m$^2$/g, high DBP absorption), and in this case, it will be possible to use a relatively small quantity of it (generally less than 15 wt %) so as to obtain the desired resistivity. The carbon black can also be simply conductive and therefore rather coarse (specific surface area less than 200 m$^2$/g, relatively low DBP absorption), and in this case, it will be appropriate to use a relatively large quantity of it (in general at least 15 wt %) so as to obtain the desired resistivity. Depending on the quality of the carbon black, the percentage of carbon black will generally range from 5 to 40 wt % of the composition in order to obtain the desired "conductive" behavior. For reasons of cost, it is preferable to use a "coarse" carbon black.

Preferably, the weight ratio of the quantity of ethylene and alkyl (meth)acrylate copolymer over the quantity of carbon black ranges from 0.8 to 1.2 and is preferably approximately 1.

The quantity of vinylaromatic monomer-diene copolymer is on the order of 2 to 20 wt %, and preferably 2 to 6 wt %. It is preferable to use this ingredient in a relatively small quantity for reasons of cost and so as not to excessively lower the modulus of the final composition.

The ingredients included in the composition according to the invention can be mixed by any apparatus ordinarily used for mixing this type of product, such as by mixers, extruders, comixers, and kneaders. The mixing temperature is sufficient for the vinylaromatic polymer preparation, the ethylene alkyl (meth)acrylate copolymer and the vinylaromatic monomer-diene copolymer to be melted. Generally, the mixing temperature resulting in the final composition will range from 200 to 280° C.

Preferably, in a first step, a masterbatch is produced, containing the carbon black and the ethylene and alkyl (meth)acrylate copolymer, and in a second step, said masterbatch is mixed with the vinylaromatic polymer preparation and the vinylaromatic monomer-diene copolymer. The preparation of this masterbatch is also done with conventional tools such as a comixer or a kneader. The masterbatch is granulated for the purpose of the second mixing which results in the final composition. The production of the masterbatch beforehand in a way facilitates manipulation of the carbon black. In effect, carbon black is extremely dirty, and it can be advantageous to produce the masterbatch (of relatively low weight compared to the final composition) in a place and using a machine specifically provided for its manipulation, and then to produce the final composition (of relatively high weight compared to the masterbatch) using another installation without having to be concerned with problems of soiling connected with the manipulation of the carbon black. Moreover, by proceeding in two steps as just described, the final composition is more homogeneous.

After the production of the composition according to the invention by the last mixing, the composition can be granulated in order to be stored for later working (transformation).

It is possible for the composition not to contain polyphenylene oxide (PPO), or ethylene and ethyl acetate copolymer, or polyester.

The invention leads to compositions offering an excellent compromise of properties, particularly a resistivity ranging from $1\times10^4$ to $1\times10^9$ and more generally from $1\times10^4$ to $1\times10^7$ Ω·cm, an excellent impact resistance, which can even exceed 13 kJ/m$^2$ (notched Charpy impact: standard ISO 179:93), and a high modulus which can exceed 1350 and even 1400 MPa (standard ISO 178:93).

EXAMPLES

In the examples, the following raw materials are used:

HPS: an impact polystyrene containing approximately 10 wt % butadiene, having a fluidity index measured according to the standard ISO 1133:91 and at 200° C. under 5 kg of approximately 4 g/10 min, a Vicat temperature measured under 1 kg according to the standard ISO 306A of approximately 97° C., a notched Charpy impact [resistance] measured on injected bars 80×10×4 mm according to the standard ISO 179:93 between 9 and 11. This copolymer is of Lacqrene 5240 brand and is marketed by the company Atofina.

EBA: an ethylene and butyl acrylate copolymer containing approximately 17 wt % butyl acrylate, with a fluidity index measured according to the standard ISO 1133:91 and at 190° C. under 2.16 kg of approximately 7 g/10 min. This copolymer is of Lotryl 17BA07 brand and is marketed by the company Atofina.

PP: an isotactic polypropylene manufactured in gaseous phase and by Ziegler-Natta catalysis, with a fluidity index measured according to the standard ISO 1133:91 and at 190° C. under 5 kg of approximately 16 g/10 min, containing approximately 10 wt % atactic polypropylene. This polypropylene is of Novolen 1100N brand and is marketed by the company Targor.

Carbon black: a coarse carbon black, characterized by a BET surface area of approximately 65 m²/g and a DBP absorption of approximately 190 mL/g, marketed by the company M.M.M. Carbon under the name "Ensaco 250 Granular."

SBS 1: a styrene-butadiene-styrene three-block linear copolymer whose structure can be represented generally by the formula S1–B–S2, in which each of S1 and S2 represents a polystyrene block and B represents a polybutadiene block. This copolymer contains 73 wt % units coming from styrene and has a weight-average molecular weight of 120,000, measured by gel permeation chromatography based on a polystyrene standardization. A small hinge block of styrene-butadiene statistical copolymer is situated between blocks S1 and B, on one hand, and between blocks B and S2, on the other hand. Block B was produced from two sub-blocks of polybutadiene, which were joined by the intermediary of a bifunctional coupling agent. This copolymer is of Finaclear 520 brand and is marketed by the company Atofina.

SBS 2: a styrene-butadiene-styrene three-block radial copolymer whose structure can be represented generally by the formula S1-B-S2, in which each of S1 and S2 represents a block of polystyrene and B represents a block of polybutadiene. This copolymer contains 40 wt % units coming from styrene. This copolymer is of Finaprene 602D brand and is marketed by the company Atofina.

In the following examples, the following methods of characterization were used:

Bending [modulus]: the standard ISO 178:93
Notched Charpy impact: the standard ISO 179:93
Volume resistivity: the standard IEC 93.

Examples 1 (Comparative) and 2 to 5

In these examples, first, a masterbatch of EBA/carbon black 50/50 by weight is produced by means of a Buss comixer whose main screw has a profile suited to the high load levels (with restriction rings situated before the load feeding zones). The mixing temperature is on the order of 200° C. This mixture is then added to the HIPS/SBS mixture in a corotating two-screw extruder and then granulated. The mixing temperature in this case is between 220 and 260° C. The granules are then transformed by injection to the form of bars 80×10×4 mm and plates 100×100×4 mm, in the case of Examples 1 and 2, and in the form of sheets with a thickness of approximately 500 μm by extrusion and in the form of plates with a thickness of approximately 2 mm by compression.

Example 1 is comparative since the final composition does not contain styrene-butadiene copolymer.

The properties obtained are assembled in Table 1.

Example 6 (Comparative)

In this example, all the components are mixed using a Buss comixer; the mixing temperature varies between 210 and 240° C. The carbon black is added by a lateral dosing device into the melted mass. The granules obtained are transformed by injection to the form of bars 80×10×4 mm and plates 100×100×4.

This example is comparative since the composition produced does not contain EBA.

The properties obtained are assembled in Table 1.

Example 7 (Comparative)

One proceeds as in the case of Example 3, except that no styrene-butadiene copolymer SBS2 is used. The properties obtained are assembled in Table 1.

TABLE 1

| | | 1 (Comparative) | 2 | 3 | 4 | 5 | 6 (Comparative) | 7 (Comparative) |
|---|---|---|---|---|---|---|---|---|
| COMPOSITION | | | | | | | | |
| HIPS | | 58 | 43.5 | 53.5 | 56 | 56 | 53.5 | 58 |
| EBA | | 21 | 26 | 21 | 21 | 21 | | 21 |
| PP | | | | | | | 21 | |
| Carbon black | | 21 | 26 | 21 | 21 | 21 | 21 | 21 |
| SBS 1 | | | 4.5 | 4.5 | 2 | | 4.5 | |
| SBS 2 | | | | | | 2 | | |
| PROPERTIES | | | | | | | | |
| Bending modulus (MPa) | Injected bars | 1364 | 1142 | 1418 | 1419 | 1410 | 2430 | 1394 |
| Notched Charpy impact (kJ/m2) | Injected bars | 2.8 | 14.2 | 13.6 | 8.4 | 9.7 | 1.6 | 3.0 |
| Volume resistivity (Ω · cm) | Compressed plates | 1.2 10⁵ | 7.2 10⁴ | | | | 6.0 10⁴ | 8.1 10⁶ |
| | Extruded sheets | 3.6 10⁵ | 5.1 10⁵ | | | | | |
| | Injected plates | 1.6 10⁵ | 4.9 10⁴ | | | | | |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

The invention claimed is:

1. A composition comprising:
   35 to 65 wt % of a radical vinylaromatic polymer
   5 to 40 wt % of ethylene and alkyl(meth)acrylate copolymer,
   2 to 20 wt % of a multiblock copolymer comprising at least a block of a vinyl aromatic polymer and at least a block of polybutadiene, and
   a necessary and sufficient quantity of conductive carbon black for the composition to have a resistivity ranging from $1 \times 10^4$ to $1 \times 10^9$ Ω·cm,
   wherein the weight ratio of the quantity of ethylene and alkyl (meth)acrylate copolymer over the quantity of carbon black ranges from 0.8 to 1.2.

2. A composition according to claim 1, wherein it contains a sufficient quantity of conductive carbon black for the composition to have a resistivity ranging from $1 \times 10^4$ to $1 \times 10^7$ Ω·cm.

3. A composition according to claim 1, wherein the radical vinylaromatic polymer preparation contains a matrix of vinylaromatic polymer surrounding nodules of rubber.

4. A composition according to claim 3 wherein the rubber is a polydiene.

5. A composition according to claim 4, wherein the polydiene is a polybutadiene.

6. A composition according to claim 1, wherein the (meth)acrylate content in the ethylene and alkyl(meth)acrylate copolymer is between 18 and 40 wt %.

7. A composition according to claim 1, wherein the (meth)acrylate content in the ethylene and alkyl(meth)acrylate copolymer is between 22 and 28 wt %.

8. A composition according to claim 1, wherein the ethylene and alkyl(meth)acrylate copolymer is an ethylene and butyl acrylate copolymer.

9. A composition according to claim 1, wherein the carbon black is present in a proportion of 5 to 40 wt %.

10. A composition according to claim 1, wherein the carbon black is present in a proportion of at least 15 wt % and has a specific surface area less than 200 m²/g.

11. A composition according to claim 1, wherein the styrene-butadiene-styrene three-block copolymer is present in a proportion of 2 to 6 wt %.

12. A composition according to claim 1, wherein its impact resistance is at least equal to that of the vinylaromatic polymer preparation which it contains.

13. A composition according to claim 1, wherein it does not contain polyphenyleneoxide (PPO) or ethylene and ethyl acetate copolymer or polyester.

14. A composition according to claim 1, wherein it has a notched Charpy impact resistance exceeding 13 kJ/m², standard ISO 179:93, and a bending modulus greater than 1350, standard ISO 178:93.

15. A composition according to claim 1, wherein it has a resistivity ranging from $1 \times 10^4$ to $1 \times 10^7$ Ω·cm and a bending modulus greater than 1400 MPa.

16. A composition according to claim 1, wherein the radical vinylaromatic polymer preparation contains at least 80 wt % polymerized units coming from the vinylaromatic monomer.

17. A composition according to claim 1, wherein the radical vinylaromatic polymer preparation contains 2 to 20 wt % polymerized units of a diene.

18. A composition according to claim 1, wherein the radical vinylaromatic polymer preparation is a homopolymer.

19. A composition according to claim 1, wherein vinylaromatic monomer-diene block copolymer contains 10 to 70% diene and 90 to 30% vinylaromatic monomer.

20. A composition according to claim 1, wherein the vinylaromatic monomer of the radical vinylaromatic polymer preparation and the vinylaromatic monomer of the vinylaromatic monomer-diene block copolymer is styrene.

21. A composition according to claim 1, wherein the diene of the vinylaromatic monomer-diene block copolymer is butadiene.

22. A process for manufacturing of a composition of claim 1, comprising in a first step, a masterbatch containing the carbon black and the ethylene and alkyl (meth)acrylate copolymer is produced, and in a second step said masterbatch is mixed with the vinylaromatic polymer preparation and the styrene-butadiene-styrene three-block copolymer.

23. Method comprising treating electronic components with a composition of claim 1 for coming in contact with electronic components.

* * * * *